United States Patent [19]

Calhoun et al.

[11] Patent Number: 5,234,974
[45] Date of Patent: Aug. 10, 1993

[54] ALKALI-SOLUBLE HYDROPHILIC POLYMER COATINGS

[75] Inventors: Glenn C. Calhoun, Mt. Pleasant; Robert W. Stackman; Michael E. Klinkhammer, both of Caledonia, all of Wis.

[73] Assignee: S. C. Johnson & Son, Inc., Racine, Wis.

[21] Appl. No.: 901,324

[22] Filed: Jun. 19, 1992

Related U.S. Application Data

[62] Division of Ser. No. 759,253, Sep. 13, 1991, Pat. No. 5,147,915, which is a division of Ser. No. 558,351, Jul. 26, 1990, Pat. No. 5,093,396.

[51] Int. Cl.$^5$ ................................................. C09K 3/18
[52] U.S. Cl. ..................................... 523/169; 422/28; 427/385.5
[58] Field of Search .................. 523/169; 422/28; 427/385.5

[56] References Cited

U.S. PATENT DOCUMENTS

| | | | |
|---|---|---|---|
| 3,308,078 | 3/1967 | Rogers et al. | 524/272 |
| 3,320,196 | 5/1967 | Rogers | 524/272 |
| 3,515,579 | 6/1970 | Shepherd et al. | 428/436 |
| 3,635,756 | 1/1972 | Shepherd et al. | 428/435 |
| 3,679,592 | 7/1972 | Schomburg | 252/153 |
| 3,886,125 | 5/1975 | Chromecek | 526/240 |
| 3,933,407 | 1/1976 | Tu et al. | 350/582 |
| 3,966,902 | 6/1976 | Chromecek | 424/59 |

OTHER PUBLICATIONS

Selected pages from textbook entitled Preparative Methods of Polymer Chemistry by W. R. Sorenson & T. W. Campbell, 1961 Interscience Publ.

Selected pages from textbook entitled Organic Polymer Chemistry by K. J. Saunders, published 1988 by Chapman & Hall of NY, N.Y.

Selected pages from a manufacturer's catalogue entitled McCutcheon's Emulsifiers & Detergents, publ. 1990 by McPubl. Co. of Glen Rock, N.J.

Selected pages from textbook entitled Official Methods of Analysis, published 1990 by AOAC of Arlington, Va.

Selected pages from Condensed Chemical Dictionary, 8th ed., published 1971 by Van Nostrand Reinhold Co. of NY, N.Y.

*Primary Examiner*—Joseph L. Schofer
*Assistant Examiner*—Jeffrey T. Smith

[57] ABSTRACT

An alkali-soluble coating formulation is disclosed. Such a coating formulation comprises a volatile, aqueous carrier; an alkali-soluble hydrophilic polymer, in the aqueous carrier; an alkali-soluble multivalent metal ion-containing bond-forming agent, also in the aqueous carrier; and an effective amount of a volatile alkali ingredient, in the aqueous carrier, for dissolving both the hydrophilic polymer as well as the multivalent metal ion-containing bond-forming agent. The relative amounts of hydrophilic polymer and multivalent metal ion-containing bond-forming agent, in the aqueous carrier, are effective for forming an alkali-soluble polymeric coating on a substrate, upon evaporation of the volatile, aqueous carrier therefrom.

1 Claim, No Drawings

ALKALI-SOLUBLE HYDROPHILIC POLYMER COATINGS

This is a divisional of co-pending application Ser. No. 07/759,253 filed on Sep. 13, 1991 now U.S. Pat. No. 5,147,915, which in turn is a divisional of Ser. No. 07/558,351 (now U.S. Pat. No. 5,093,396) filed Jul. 26, 1990, the benefit of which is now claimed for purposes of priority pursuant to 35 USC Sec. 120.

TECHNICAL FIELD

The present invention, in general, is directed to a novel, durable, alkali-soluble, hydrophilic polymer coating formulation which can be applied to a variety of substrates such as floor tiles, countertops, wall and shower tiles, and so forth. The alkali-soluble, hydrophilic polymer coating of our invention is able to provide such a substrate with a type of coating—characterized as a "water-sheeting" coating—that is specifically formulated for the purpose of inhibiting water-beading (that is, specifically formulated for the purpose of promoting water-spreading) and otherwise minimizing water-spotting on a substrate surface. Yet another advantage of the hydrophilic polymer coating of the coating formulation of our present invention, because such a coating is alkali-soluble, is that the formulation is readily able to be utilized as a temporary coating.

A preferred type of substrate, moreover, is either transparent or reflective; and we have further discovered, surprisingly, that the novel, hydrophilic polymer coating formulation of our present invention is able to provide an "anti-fog" (or fog-resistant) coating for such a substrate. Accordingly, one preferred use of the alkali-soluble coating formulation of our present invention is for application onto an otherwise fog-susceptible substrate such as either (1) a windowpane (or a like transparent surface) or (2) a mirror (or a like reflective surface), for preventing or otherwise resisting the formation of fog thereupon.

The alkali-soluble polymeric coating formulation of our present invention, moreover, can include a biocidally-active ingredient; and, still another preferred use of the alkali-soluble coating formulation involves applying an effective amount of the biocidally-active ingredient-containing coating formulation onto a substrate, for purpose of providing such a substrate with biocidal activity.

BACKGROUND ART

U.S. Pat. No. 3,308,078 to Rogers et al. generally relates to coating compositions, to methods of applying such coating compositions to substrates to produce films thereon, and to methods of removing such films from such substrates. These coating compositions, more particularly, are said to contain a polymer, a resin, and a metal-containing complex.

U.S. Pat. No. 3,320,196 (also to Rogers) similarly relates to coating compositions, to methods of applying such coating compositions to substrates to produce films thereon, and to methods of removing such films from such substrates. The various coating compositions of the '196 Rogers patent, more particularly, are said to contain a polymer, a resin, and a zirconyl-containing complex.

U.S. Pat. No. 3,679,592 to Schomburg discloses certain compositions that are said to consist of a film-forming component, a surfactant, a scale inhibitor, an organic solvent, and water. Such compositions are said to be effective for cleansing so-called "hard" surfaces and for otherwise inhibiting the deposition of soils or stains onto such surfaces.

In U.S. Pat. Nos. 3,886,125 and 3,966,902, both to Chromecek, certain polymer complexes are disclosed. Such polymer complexes are said to be composed of a polymer that contains hydrophilic functional groups as well as certain metals bound in complex form. Such polymer complexes are said to be prepared by contacting a reaction mixture which contains the functional group-containing polymer, or the monomeric precursor thereof, with a salt of a particular metal, for purposes of complexing such a metal.

In U.S. Pat. Nos. 3,515,579 and 3,635,756, both to Shepherd et al., there are disclosed certain so-called "nonfogging" coatings that are said to be so specifically formulated as to be able to be applied onto transparent or reflective substrates which are normally subject to fogging. In U.S. Pat. No. 3,933,407 to Tu et al., moreover yet another so-called "anti-fog" coating, which is based upon inclusion of a siloxane-oxyalkylene block copolymer, is disclosed.

Such coatings are specifically formulated to provide permanent films on a substrate. For example, one stated object of the '579 Shepherd patent is to provide a coating that "is resistant to ammonia and common alkaline cleaning preparations". In this regard, the polymeric coatings disclosed in the '756 Shepherd patent, furthermore, are touted as being "solvent resistant". Still further, the coatings disclosed in the '407 Tu patent, in addition to being generally described as "solvent resistant", are said to be useful for purposes of imparting "resistance to ammonia and other common alkaline cleaning preparations".

For a variety of reasons, however, it would be desirable to be able to readily remove a variety of substrate-applied coatings—such as anti-fog coatings and other types of coatings—from various substrates, whenever desired.

SUMMARY DISCLOSURE OF INVENTION

We have discovered a hydrophilic polymer coating formulation, wherein the hydrophilic polymer coating—that is produced as a result of the evaporation of the volatile components of the formulation—is alkali soluble. Such a coating, because it is alkali soluble, is thus readily able to be removed from virtually any particular substrate onto which it has been applied. For example, one preferred method of removing our substrate-applied coating is by simply dissolving the coating with mild alkali.

In accordance with the above, the alkali-soluble coating formulation of our present invention comprises a volatile, aqueous carrier; an alkali-soluble hydrophilic polymer, in the aqueous carrier; an alkali-soluble multivalent metal ion-containing bond-forming agent, also in the aqueous carrier; and an effective amount of a volatile alkali ingredient, in the aqueous carrier, for dissolving both the hydrophilic polymer as well as the multivalent metal ion-containing bond-forming agent.

The relative amounts of two particular ingredients, namely the hydrophilic polymer and the multivalent metal ion-containing bond-forming agent, in the aqueous carrier, are effective for forming an alkali-soluble polymeric coating on a substrate, upon evaporation of the volatile carrier therefrom.

The hydrophilic polymer is prepared by polymerizing or copolymerizing a monomeric mixture comprising about 5 to about 100 percent of a carboxylic acid-functional monomer and 0 up to about 95 percent of a hydrophilic monomer, based upon the weight of the monomeric mixture. (Unless otherwise indicated, our use of the terms "percent" and "%" shall herein be understood to mean weight percent, based upon total weight.)

The multivalent metal ion, of the multivalent metal ion-containing bond-forming agent mentioned above, is selected from the group consisting of cadmium ion, copper ion, nickel ion, zinc ion, zirconium ion, and combinations thereof.

BEST MODE FOR CARRYING OUT THE INVENTION

The hydrophilic polymer of the coating formulation of our invention is prepared, via known solution polymerization techniques, by free-radical addition-polymerizing the monomeric mixture in a suitable solvent and in the presence of a suitable free-radical initiator. For example, a number of well-known solution polymerization techniques are disclosed in the text entitled "Preparative Methods of Polymer Chemistry", at pages 162, 166, 171, 179–181, 185, and 213–214, by W. R. Sorenson and T. W. Campbell, published 1961 by Interscience Publishers of New York, N.Y. Other well-known solution polymerization techniques are disclosed in the text entitled "Organic Polymer Chemistry", second edition, at pages 25, 78, 108, 118, 130, 141, and 144, by K. J. Saunders, published 1988 by Chapman and Hall of New York, N.Y.

Solvents that are suitable for purposes of producing the hydrophilic polymer of the coating formulation of our present invention include but are not limited to water, $C_1$ to $C_4$ alcohols, glyme, diglyme, low molecular weight polyethylene oxide and its alkyl and dialkyl ethers, ethylene and propylene glycol, tetrahydrofuran ("THF"), para-dioxane (i.e., 1,4-dioxane), dimethyl formamide, dimethyl acetamide, and various mixtures and combinations of these.

For example, alcohols such as methanol, ethanol, and isopropanol, as well as various mixtures of these alcohols, would be suitable solvents for purposes of producing the hydrophilic polymer of the coating formulation of our invention.

Preferred solvents, for purposes of producing the hydrophilic polymer of the coating formulation of our invention, are selected from the group consisting of water, alcohol, tetrahydrofuran, para-dioxane, and mixtures thereof.

More preferred solvents are selected from the group consisting of water, alcohol, and mixtures thereof.

Preferred alcohol solvents include methanol, ethanol, and isopropanol.

Solution polymerization is effected in the presence of a so-called "catalyst" or initiator, which serves as a source of free radicals.

Among such free-radical initiators which may be mentioned are various peroxides and hydroperoxides, various persulfates, various perphosphates, various perborates, and various azo compounds, as well as various mixtures of these.

Examples of suitable azo-type free-radical initiators, for purposes of this disclosure, include azobisdimethyl valeronitrile, azobisisobutyl nitrile, and azodiisobutyl amide.

Examples of suitable initiators that are water-soluble, and which may be mentioned as illustrative, for purposes of our present invention, are peroxides such as hydrogen peroxide; hydroperoxides such as tertiary-butyl hydroperoxide; and persulfates such as sodium, potassium and ammonium persulfate.

Preferred water-soluble initiators are selected from the group consisting of ammonium persulfate ("APS"), potassium persulfate, and combinations thereof.

The amount of initiator used is normally about 0.03 to about 3.0 weight percent ("wt.-%"), based on the total weight of all monomer utilized in the preparation of the monomeric mixture (mentioned above), and preferably is about 0.05 to about 1.0 wt.-% of total weight of such monomeric mixture.

Other suitable initiators include the so-called "redox combination" which may consist of a water-soluble persulfate as the "oxidizing" component of the redox combination, and a hydrosulfite, e.g. sodium hydrosulfite, as the "reducing" component of the redox combination. In this regard, water-soluble bisulfates, metabisulfites, and/or thiosulfates, as well as formaldehyde sulfoxilate, may be used in lieu of the hydrosulfite. Generally useful proportions of the above indicated persulfate-hydrosulfite system are about 0.01 wt.-% to about 1.0 wt.-% for the oxidizing component and about 0.015 to about 1.5 wt.-% for the reducing component, based upon the total weight of all monomer utilized in the monomeric mixture.

As was briefly mentioned above, the hydrophilic polymer, in general, can be prepared via known solution polymerization techniques by e.g. polymerizing or copolymerizing a monomeric mixture comprising about 5 to about 100 weight percent of a carboxylic acid-functional vinyl monomer and up to about 95 weight percent of a hydrophilic vinyl monomer, based upon the total weight of the monomeric mixture.

Preferably, the hydrophilic polymer is thus prepared by copolymerizing 10 to 80 weight percent of a carboxylic acid-functional vinyl monomer with 20 to 90 weight percent of a hydrophilic vinyl monomer based upon the total weight of the monomeric mixture. More preferably, the hydrophilic polymer is prepared by copolymerizing 15 to 60 weight percent of a carboxylic acid-functional vinyl monomer with 40 to 85 weight percent of a hydrophilic vinyl monomer based upon the total weight of the monomeric mixture.

Typically, the thus-prepared hydrophilic polymer has a number-average molecular weight ("Mn") of at least about 1,000 but no more than about 2,000,000. Preferably, the hydrophilic polymer has a Mn of about 3,000 to about 1,000,000. More preferably, the hydrophilic polymer has a Mn of about 10,000 to about 200,000.

Typically, the thus-prepared hydrophilic polymer has a glass-transition temperature ("Tg") of at least −130 degrees Celsius ("° C.") but no more than 250° C. Preferably, the hydrophilic polymer has a Tg of about −50° C. to about 200° C. More preferably, the hydrophilic polymer has a Tg of about −30° C. to about 180° C.

Carboxylic acid-functional vinyl monomers that are suitable for purposes of producing the hydrophilic polymer of the coating formulation of our present invention include but are not limited to aconitic acid, acrylic acid, beta-carboxyethyl acrylate, cinnamic acid, crotonic acid, fumaric acid, itaconic acid, maleic acid, methacrylic acid, and mixtures thereof.

Preferred carboxylic acid-functional vinyl monomers are selected from the group consisting of acrylic acid, methacrylic acid, and mixtures thereof.

Hydrophilic vinyl monomers that are suitable for purposes of producing the hydrophilic polymer of the coating formulation of our present invention include but are not limited to acrylamide, dimethyl acrylamide, dimethyl methacrylamide, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, methacrylamide, N-vinyl-2-pyrrolidone ("vinyl pyrrolidone"), acrylates and methacrylates of polyethylene glycol monoalkylethers, and mixtures thereof.

Preferred hydrophilic vinyl monomers are selected from the group consisting of 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, and mixtures thereof. A most preferred hydrophilic vinyl monomer is 2-hydroxyethyl methacrylate ("HEMA").

As was briefly mentioned above, the alkali-soluble polymeric coating formulation of our present invention comprises a volatile, aqueous carrier; an alkali-soluble hydrophilic polymer, in the aqueous carrier; an alkali soluble multivalent metal ion-containing bond-forming agent, also in the aqueous carrier; and an effective amount of alkali, in the aqueous carrier, for dissolving in the aqueous carrier both the hydrophilic polymer as well as the multivalent metal ion-containing bond-forming agent.

The relative amounts of two particular ingredients, namely the hydrophilic polymer and the multivalent metal ion containing bond-forming agent, in the aqueous carrier, are effective for forming an alkali-soluble polymeric coating or film on a substrate, upon evaporation of the volatile carrier therefrom.

As was also briefly mentioned above, one preferred use of our novel alkali-soluble polymeric coating formulation is in combination with a fog-susceptible substrate. In particular, we have found that the relative amounts of hydrophilic polymer and multivalent metal ion-containing bond-forming agent, in the aqueous carrier, are effective, upon application of the alkali-soluble polymeric coating formulation onto such a fog-susceptible substrate, for forming an anti-fog (or fog resistant), alkali-soluble polymeric coating or film on the substrate, upon evaporation of the volatile carrier therefrom.

The volatile, aqueous carrier of the coating formulation of our present invention, in this regard, preferably comprises water and various other water miscible volatile organic liquids. Such Water miscible volatile organic liquids are typically selected from the group consisting of alcohol, ether, glyme, diglyme, ethylene and propylene glycol, low molecular weight polyethylene oxide and its alkyl and dialkyl ethers (i.e., having a number-average molecular weight of less than about 200), dimethyl formamide, dimethyl acetamide, and various mixtures thereof.

Preferably, such water miscible volatile organic liquids are selected from the group consisting of alcohols, ethers, and mixtures thereof.

Specific examples of alcohols that are suitable for purposes of our present invention include alkanols such as methanol, ethanol, isopropanol, and various mixtures thereof.

Specific examples of ethers that are suitable for purposes of the present invention include ethylene glycol dimethyl ether, para-dioxane (i.e., 1,4-dioxane), tetrahydrofuran ("THF"), and mixtures thereof.

The multivalent metal ion-containing bond-forming agent includes a multivalent metal ion that is selected from the group consisting of cadmium ion, copper (II) ion, nickel ion, zinc ion, zirconium ion, and combinations thereof.

While not wanting to be tied to any particular theory, yet desirous of rendering a complete and accurate disclosure, it is presently postulated that the metal ion-containing bond-forming agent forms ionic bond with the carboxylic acid moiety of the hydrophilic polymer. In particular, such a bond is characterized as "pH-sensitive" in that the hydrophilic polymer and the multivalent metal ion-containing bond-forming agent dissolve in "basic" aqueous media having a pH of 7.5 or greater. However, upon changing the hydrogen ion concentration of the media from that of a mild alkali (i.e., having a pH of about 7.5) to a pH of 7.0 or less, a quasi-crosslinked coating or film can be produced from predetermined ratioed amounts of hydrophilic polymer and multivalent metal ion-containing bond-forming agent, thereby producing the quasi-crosslinked coating or film, mentioned above. The thus-produced coating or film can again be dissolved by applying "basic" aqueous media having a pH of 7.5 or greater thereto. Such a coating or film is thus not a truly "crosslinked" structure. (See, e.g., page 244 of a text entitled "The Condensed Chemical Dictionary, eighth edition, published 1981 by Van Nostrand Reinhold Company.)

The hydrophilic polymer coating is preferably "delivered from" (i.e., applied utilizing) a volatile, aqueous carrier containing a volatile alkali ingredient; and the volatile, aqueous carrier is thus characterized as a volatile, "basic" (i.e., base-containing) aqueous medium.

Suitable volatile alkali ingredients are selected from the group consisting of volatile amines, ammonia, and various mixtures thereof.

Volatile amines that are suitable for purposes of our invention include but are not limited to methyl amine, dimethyl amine, trimethyl amine, ethyl amine, diethyl amine, triethyl amine, propyl amine, isopropyl amine, diisopropyl amine, dipropyl amine, butyl amine, sec-butyl amine, tertbutyl amine, and combinations thereof.

The hydrophilic polymer coating, moreover, is delivered from "basic" solutions preferably containing 0.1 wt.-% to 20 wt.-% solids in such a volatile, aqueous medium. Still more particularly, the "basic" aqueous medium generally will have a pH of about 7.5 to about 12.0..

Typically, the base is present in the base-containing volatile aqueous medium in an amount sufficient to cause the hydrophilic polymer as well as the multivalent metal ion-containing bond-forming agent to dissolve in the aqueous medium. The mole percent of ammonia (or volatile amine) as well as the mole percent of metal ion of the multivalent metal ion-containing bond-forming agent are determined by the number of moles of acid-functional moiety or moieties present in the hydrophilic polymer. In particular, with respect to the hydrophilic polymer, the number of moles of acid-functional moiety or moieties are determined by titration, using e.g. a standardized sodium hydroxide solution as the titrating agent and titrating to a phenolphthalein endpoint, as is well-known to those skilled in the art.

The multivalent metal ion-containing bond-forming agent is represented by the structural formula $M(NR_1R_2R_3)_nY_2$, wherein "M" is a metal that is selected from the group consisting of cadmium, copper, nickel, zinc, zirconium, and combinations thereof; wherein "N" is nitrogen; wherein $R_1$ is hydrogen or a monovalent alkyl radical containing 1–4 carbon atoms; wherein $R_2$ is hydrogen or a monovalent alkyl radical containing either 1 or 2 carbon atoms; wherein $R_3$ is hydrogen or a monovalent alkyl radical containing either 1 or 2 carbon atoms; wherein "n" is the so-called "co-ordination number" of an above-mentioned thus-selected metal; and wherein "Y" is a weak acid anion or polyanion selected from the group consisting of acetate, carbonate, formate, and the like, and combination thereof. The co-ordination number, "n", more particularly, is an integer ranging from about 1 to about 8. Preferably, $R_1$, $R_2$ and $R_3$ are each hydrogen.

As was mentioned above, the alkali-soluble hydrophilic polymer coating formulation is "delivered" (i.e. applied) onto e.g. the surface of a substrate, and the hydrophilic polymer coating is caused to adhere to the substrate surface by the evaporation therefrom of the volatile ingredients of the formulation. Such volatile ingredients thus principally include water and the volatile base mentioned above; and evaporation of these volatile ingredients typically takes place at room temperature (that is, about 25 degrees Celsius) or at slightly elevated temperature, but generally not at a temperature that is greater than 90° C.

Optionally, a variety of commercially-available surfactants and wetting agents can be added to the above-described volatile, aqueous-based medium to enhance certain selected properties of the coating, such as "coating formulation levelness", "substrate wetting", and "coating uniformity".

Suitable optional surfactants, for purposes of the present invention, include but are not limited to anionic surfactants, cationic surfactants, nonionic surfactants, and combinations thereof.

Of these, the preferred optional surfactants of this invention are the non-ionic surfactants. In this regard, those non-ionic surfactants that are suitable for purposes of our invention include but are not limited to certain alkanolamides; certain amine oxides; certain carboxylated alcohol ethoxylates; certain ethoxylated alcohols; certain ethoxylated alkyl phenols; certain ethoxylated amides; certain ethoxylated fatty acids; certain ethoxylated fatty esters and oils (animal & vegetable); certain fatty esters (other than glycol, glycerol, and that sort); certain fluorocarbon-based surfactants; certain glycerol esters and glycol esters; certain lanolin-based derivatives; certain lecithin based derivatives; certain monoglycerides and their derivatives; certain propoxylated and ethoxylated fatty acids and/or alcohols and/or alkyl phenols; certain protein-based surfactants; certain silicone-based surfactants; certain sorbitan derivatives; and certain sucrose esters and their derivatives. (See, for example, pages 265–286 of the 1990 North American edition of a manufacturer's catalogue entitled "McCutcheon's Emulsifiers & Detergents", published by the McCutcheon Division of the MC publishing Company of Glen Rock, N.J.)

For purposes of providing a complete disclosure anionic emulsifiers that are suitable for purposes of our invention include but are not limited to certain alkylaryl sulfonates; certain sulfonated amides; certain detergent intermediates (e.g. the alcohols, the fatty acids, the alkyl aryl sulfonic acids); certain diphenyl sulfonate derivatives; certain ethoxylated alkyl phenols; certain heterocyclic-type emulsifiers; certain isethionates; certain lanolin-based derivatives; certain lecithin-based derivatives; certain monoglycerides and their derivatives; certain olefin sulfonates; certain phosphate derivatives; certain phosphate esters; certain propoxylated and the ethoxylated fatty acids and/or alcohols and/or alkyl phenols; certain protein-based surfactants; certain sarcosine derivatives; certain silcone based surfactants; certain sorbitan derivatives; certain sucrose esters and their derivatives; certain sulfates and sulfonates of ethoxylated alkyl phenols; certain sulfates and sulfonates of oils and fatty acids; certain sulfates of alcohols; certain sulfates of ethoxylated alcohols; certain sulfates of fatty esters; certain sulfonates of benzene and/or toluene and/or xylene; certain sulfonates of condensed naphthalenes; certain sulfonates of the dodecyl and the tridecyl benzenes; certain sulfonates of naphthalene and the alkyl naphthalenes; certain sulfonates of petroleum; certain sulfosuccinates and their derivatives; certain taurates; certain thio and mercapto derivatives; and certain tridecyl and dodecyl benzene sulfonic acids. (See, for example, pages 265–286 of the 1990 North American edition of "McCutcheon's Emulsifiers & Detergents", McCutcheon Division, MC Publishing Company, Glen Rock, N.J.)

Cationic surfactants that are suitable for purposes of our invention include but are not limited to alkyl trimethyl ammonium bromide, alkyl trimethyl ammonium chloride, benzyl trimethyl ammonium chloride, alkenyl dimethylethylammonium bromide, dialkyl quaternary ammonium chloride, alkyl dimethylbenzyl ammonium chloride, alkyl dimethyl substituted benzylammonium chloride, quaternary ammonium compounds with and without ether linkages, and various combinations of these.

Suitable wetting agents, for purposes of the present invention, include but are not limited to ethylene oxide oligomers, fluoro surfactants, polysiloxane-oxyalkylene block copolymers, and combinations thereof.

A still more preferred method of "delivering" the coating formulation of the present invention onto a suitable substrate is to utilize a base containing aqueous medium, wherein ammonia is the base, and wherein the nonvolatile components of the coating formulation comprise 0.1 wt.-% to 20 wt.-% of the weight of the base-containing and formulation-containing aqueous medium. The hydrophilic acid-functional polymer together with the metal ion-containing bond-forming agent constitute about 10 wt.-% to about 95 wt.-% of the so-called "nonvolatile" components of the coating formulation, while the remaining 5 wt.-% to 90 wt.-% of the nonvolatile components of the coating formulation typically includes such other ingredients as emulsifiers (or surfactants), wetting agents, perfumes, preservatives such as antimicrobial agents, and so forth.

The hydrophilic acid-functional polymer is incorporated into an aqueous medium by dissolving the acid-functional polymer in an aqueous solution containing a volatile base, such as 70 mole percent to 350 mole percent ammonia, or a volatile amine present in suitable amount. Also included in the aqueous medium, but in dissolved form, is 5 mole % to 50 mole % of the multivalent metal ion-containing bond-forming agent. (The mole percentages of ammonia or volatile amine as well as the mole percentages of the multivalent metal ion-containing bond-forming agent are determined on the basis of the moles of acidic moiety such as carboxylic acid moiety present in the acid-functional polymer-containing aqueous medium.)

Such a volatile aqueous medium, upon being applied either to a horizontal substrate surface, or to the vertical substrate surface mentioned above, or to an otherwise nonhorizontal substrate surface, is able to provide an alkali-soluble polymeric film on substrate surfaces which are disposed (i.e., "oriented") in such a manner.

Moreover, the volatile aqueous medium can readily be so formulated as to be able to dry to a polymeric film at room temperature (i.e., 25 degrees Celsius) or even cooler conditions (e.g., 10° C.), as desired, depending upon the relative amounts of volatile components within the basic aqueous medium.

Still further, and as was mentioned above, upon evaporation of the volatile components of the coating formulation, the polymeric coating or film that is thus applied onto the substrate surface is insoluble in water; and, as a result, such a film is able to provide the thus-coated surface of any particular substrate onto which the polymeric film has been applied with a so-called "water-sheeting" effect. Such a polymeric film, while not being able to be readily removed from the substrate by flowing water only, is readily able to be removed from the thus-coated surface of the substrate by application to the substrate surface of a "base"-containing solution. For example, such a polymeric film can readily be removed from the substrate surface onto which it is applied by washing the surface with an aqueous solution of base, such as ammonia or sodium (or potassium) hydroxide, at a pH of about 7.5 or greater. Preferably, the polymeric film is removed utilizing an aqueous ammonia solution at a pH of about 7.5 to about 10.

Industrial Applicability

The alkali-soluble hydrophilic polymeric coating formulation of our invention can be used, for example, to produce a surface coating within a shower stall. To that end, our polymeric coating formulation can include leveling agents, biocides, surfactants (or "emulsifiers"), perfumes, and various combinations of these, for purposes of providing a resultant coating formulation that exhibits, for example, relatively long-lasting water-sheeting and, more particularly, certain mildew-control shower stall surface coating properties.

Suitable biocides or biocidally-active ingredients for purposes of our present invention include but are not limited to phenols, quaternary ammonium salts, and combinations of these. It might be desirable that the biocidally-active alkali-soluble polymeric coating formulation be perfumed. Suitable perfumes or fragrances for purposes of the present invention are well known to those skilled in the art and a list of such need not be included. However, for purposes of providing a complete disclosure, mention may now be made of one particularly suitable fragrance, known as BBA 884679", which is manufactured by Bush Boake Allen., Incorporated, of Montvale, N.J.

As was mentioned above, our polymeric coating can advantageously provide either a transparent or a reflective substrate—that is normally subject to fogging—with a so-called anti-fogging or fog-resistant coating which, although durable and water-insoluble at neutral pH, readily dissolves in mild alkali and is thus readily removable by alkali whenever desired. Mirrors, highly-polished metal surfaces, and other reflective substrates, as well as transparent substrates normally found in and around the home and office, including, for example, windowpanes, automobile and other motor vehicle windows and the like, could thus all be rendered anti-fogging or fog-resistant upon application of the hydrophilic polymeric coating of our invention onto the respective surfaces thereof.

DETAILED DESCRIPTION OF EXAMPLES

The following examples are set forth to illustrate more clearly, to those skilled in the art, the various principles and practice of this invention. Yet as such, they are not intended to limit our invention but rather are merely illustrative of certain aspects of the various preferred embodiments. In these examples, the molecular weight of the polymer was determined by gel permeation chromatography ("GPC"), using either (1) tetrahydrofuran ("THF") as eluent and poly(styrene) standards or (2) a methanol/water mixture as eluent and poly(sodium styrene sulfonate) standards. The poly(styrene) standards thus utilized, which are presently commercially available from Polymer Laboratories, Limited, of Church Stretton, Great Britain, are more particularly characterized as having number-average molecular weights of 2,250,000; 1,030,000; 570,000; 156,000; 66,000; 28,500; 9,200; 3,250; and 1,250.

The methanol/water mixture utilized is more particularly characterized as 35 weight percent ("wt.-%") methanol, based upon total weight of mixture. The poly(sodium styrene sulfonate) standards utilized, presently commercially available from Scientific Polymer products of Ontario, N.Y., are more particularly characterized as having number-average molecular weights of 1,060,000; 690,000; 354,000; 177,000; 88,000; 65,000; 31,000; 16,000; 6,500; 4,000; and 1,600.

EXAMPLE 1: SHOWER STALL COATING POSSESSING MILDEW ACTIVITY

A shower stall coating possessing activity against mildew was produced as follows.

A monomer-containing mixture was prepared at room temperature (i.e., about 25° C.) as follows. Into a 250-milliliter flask, the following ingredients were added simultaneously: 90 grams of 2-hydroxyethyl methacrylate ("HEMA") hydrophilic monomer; 60 grams of acrylic acid ("AA") carboxylic acid-functional monomer; 2.0 grams of 2,2,-azobis 2-methyl propionitrile ("AIBN") initiator; and 75 grams of para-dioxane solvent, thereby producing the monomer-containing mixture, mentioned above. The flask-contained mixture was then set aside, at room temperature, until needed for use. This flask, which thus contained a polymerizable monomeric mixture, is designated as "Flask No. 1" throughout the remaining discussion concerning Example 1 hereinbelow.

Next, an additional 225 grams of para-dioxane (i.e., 1,4-dioxane) solvent was introduced into a 500-milliliter 4-necked flask ("Flask No. 2"), which was equipped with a stirrer and heating means. The solvent within the 4-necked flask was stirred and heated to a reaction temperature of about 90 degrees Celsius ("°C.") while the inert gas nitrogen ("N2") was maintained in the headspace of Flask No. 2. Then to the thus=heated-and-agitated flask-contained solvent was added 0.25 grams of the above-mentioned AIBN initiator.

Immediately thereafter, the above-described monomeric mixture within Flask No. 1 was added to the contents of Flask No. 2 at a uniform addition rate over a period of about 2 hours. After completion of addition of such monomeric mixture to the 4-necked flask ("Flask No. 2"), an additional 0.25 grams of AIBN initiator was quickly added to the contents of Flask No. 2. Finally, the now-polymerizing reaction solution within Flask No. 2 was stirred for an additional hour, while the reaction temperature of 90° C. was maintained, before heat was removed.

The resultant hydrophilic polymer-containing solution, determined as being about 35 percent nonvolatiles ("% NV") on a total weight basis, was thereafter introduced into ethyl acetate for the purpose of precipitating out the thus-produced hydrophilic polymer.

In particular, 200 grams of the hydrophilic polymer-containing solution was introduced into 4000 milliliters of ethyl acetate at room temperature (i.e., 25 degrees Celsius). Then, 52 grams of the thus-precipitated hydrophilic polymer, which had the appearance of a "white powder", was filtered and thereafter recovered. The thus-recovered hydrophilic polymer precipitate was then rinsed with 200 additional grams of ethyl acetate precipitant, and was thereafter dried under vacuum.

Then, utilizing the above-described GPC analytical methods, the thus-produced hydrophilic polymer was determined as having a number-average molecular weight ("$M_n$") of about 10,000 and a weight-average molecular weight ("$M_w$") of about 50,000. The thus-produced hydrophilic polymer, moreover, consisted of 40 weight percent acrylic acid (the carboxylic acid-functional vinyl monomer) and 60 weight percent 2-hydroxyethyl methacrylate (the hydrophilic vinyl monomer).

The thus-produced hydrophilic polymer was then utilized to produce a polymeric shower stall coating formulation possessing mildew activity. The details are as follows.

533 grams of a 10 wt.-% hydrophilic polymer-containing solution was prepared by dissolving 50 grams of the thus-produced hydrophilic polymer into 428 grams of de-ionized water and 22 grams of commercially-available concentrated ammonia (i.e., 28-30 weight percent ammonia in water). To this was added 33 grams of a 15 weight percent ("wt.-%") aqueous solution of zinc ammonium carbonate.

Next, into 99.78 weight percent ("wt.-%") of the thus-produced 10 wt.-% hydrophilic polymer-containing solution was added 0.2 wt.-% of a liquid ingredient, which functioned both as a germicidally-active ingredient and as a cationic surfactant. Such ingredient, is available as a liquid from Lonza, Incorporated, of Fair Lawn, N.J., under the brand name "HYAMINE 3500". Such a liquid ingredient is made up of 50 weight percent ("wt-%") "actives" in de-ionized water. The "active" ingredient, in particular, is N-alkyl (namely, a mixture of $C_{12}$, $C_{14}$ and $C_{16}$) dimethyl benzyl ammonium chloride.

Finally, into the thus-agitated hydrophilic polymer-containing solution was added 0.02 wt.-% of a commercially-available wetting agent, for purposes of producing a mildew activity-possessing shower stall coating formulation. The thus-produced 10 wt.-% hydrophilic polymer-containing solution functioned as a so-called "film-former" in the shower stall coating formulation. The wetting agent utilized, a fluorosurfactant known by those skilled in the art by its brand name (i.e., "ZONYL FSJ") is made up of 25 weight percent fluoroalcohol phosphate, 15 weight percent stearyl amine ethoxylate quaternary sulfate, 15 weight percent isopropyl alcohol, and 45 weight percent water. "ZONYL FSJ" brand wetting agent is available from E. 1. du pont de Nemours & Co. of Wilmington, Del.

The mildew activity-possessing shower stall coating formulation Was thus made up of 1000 parts-per-million (p.p.m.) active quaternary ammonium compound in solution. In particular, the "activity" was contributed by the "HYAMINE 3500" ingredient.

Again utilizing the active quaternary ammonium compound (mentioned above), a number of mildew activity-possessing shower stall coating formulations (made from the above-discussed ingredients) were prepared so as to constitute 250 p.p.m. and 500 p.p.m. active quaternary ammonium compound in solution.

The thus-produced 250-p.p.m., 500-p.p.m., and 1000-p.p.m. "active" quaternary ammonium compound-containing solutions—each constituting a biocidally-active embodiment of the alkali-soluble coating formulation of our present invention—were then tested for activity against a mixed fungus inoculum using procedures set forth hereinbelow. The mixed fungal inoculum was prepared as follows.

Preparation Of Mixed Fungal Inoculum

A mixed (i.e., "pooled") spore suspension of several pure cultures of fungi were isolated from various selected tile grouts, such fungi presently being found throughout the United States. These pure cultures of fungi included *Alternaria alternata, Aspergillus niger, Aureobasidium pullulans, Cladosporium cladosporioides, Drechslera australiensis, Gliomastix cerealis, Monilia grisea, Penicillium commune, Phoma fimeti, Pithomyces chartarum,* and *Scolecobasidium humicola.*

Solutions consisting of 0.1 weight percent "Triton X-100" brand octylphenoxy polyethoxy ethanol surfactant and one (1) weight percent peptone in water were prepared by simply combining the ingredients. "Triton X-100" brand surfactant, available from the Rohm and Haas Co. of Philadelphia, Pa., is a liquid non-ionic surfactant having a hydrophile-lipophile balance ("HLB") value of 13.5. "Triton X-100" brand surfactant is also said to possess utility as a wetting agent, a detergent, a dispersant, and as an emulsifier. (See, e.g., page 192 of Volume 1 of McCutcheon's Emulsifier & Detergents, North American Edition, published 1990.) Peptone is a nutrient, well-known by those skilled in the art of bacteriology. (See, e.g., page 668 of The Condensed Chemical Dictionary, eighth edition.)

A pure culture of each such fungal species was grown in a commercially-available agar plate on conventional potato dextrose agar at 28° C. for 7 days, for purposes of achieving sporulation. Upon completion of the 7-day sporulation period, 10 milliliters of the above-mentioned peptone-containing aqueous solution was introduced onto each plate. Immediately following the introduction of the peptone-containing aqueous solution, each such spore culture was then scraped free from its mycelia, utilizing separate inoculation loops, for purposes of harvesting the various spore cultures. ("Mycelia" is the vegetable structure of a fungus.)

Inoculation loops may be formed of commercially-available wire by those skilled in the art or may e.g. be manufactured commercially of various materials such as plastic. The metal-wire inoculation loop utilized by us comprised a circular portion having a diameter of about three-eighths (⅜) of an inch, and a handle portion having a length of about 5 to about 6 inches. Each such inoculation loop held about 0.01 milliliters of liquid.

The various spore cultures, thus harvested, were then combined to make a pure culture fungal mixture. The pure culture fungal mixture was then stored at about 4° C. to about 6° C., to enable us to utilize the thus-refrigerated pure culture mixture for a period of up to about 6 months. We usually grow new inocula every 4 to 6 months; certain species of fungi, however, are known to survive even longer.

Fungal Mixture Activity-Testing Procedure

Seventeen (17) commercially-available one-inch square ceramic tiles were obtained. After being sterilized, each of five (5) of the original seventeen (17) tiles had 0.2 milliliters of the 250-p.p.m. active quaternary ammonium compound-containing solution applied thereto; each of five (5) other ones of the original seventeen (17) tiles had 0.2 milliliters of the 500-p.p.m. active quaternary ammonium compound-containing solution applied thereto; and each of five (5) still other ones of the original seventeen (17) tiles had 0.2 milliliters of the 1000-p.p.m. active quaternary ammonium compound-containing solution applied thereto.

Two (2) untreated tiles, of the original seventeen (17) tiles, were utilized for "control" purposes.

Each such solution-applied tile was then allowed to airdry, in a horizontal position, at room temperature (i.e., at about 25° C.) until the biocidally-active solution applied thereto dried to a surface coating thereon.

The preparation of the mixed fungus-containing spore suspension is described immediately hereinabove.

A desired quantity of a ten (10) weight percent peptone-containing aqueous solution was produced by simply combining 10 grams of peptone with 90 milliliters of de-ionized water to produce a mixture, and thereafter sterilizing the thus-produced mixture at 121° C. from about 15 minutes to about 20 minutes. About five (5) milliliters of the mixed (i.e., the "pooled") fungus-containing spore suspension, which was mentioned above as having been stored at a temperature of about 4° C. to about 6° C., was combined with an equal volume of the 10 weight percent peptone-containing solution (also referred to as "the inoculum") at 25° C., to produce a nutrient-containing mixed-fungal spore suspension.

Next, about 0.2 milliliters of the mixed-fungal spore suspension was applied to each one of the fifteen (15) abovedescribed surface-coated tiles. The two (2) untreated tiles (mentioned above) were similarly inoculated, for purposes of serving as "controls". Each such inoculated tile was allowed to air dry, while in a horizontal position, at room temperature (i.e., about 25° C.). Thereafter, each such inoculated tile was placed in a controlled environment where the temperature was maintained at 28° C. and the humidity was maintained at 95 percent relative humidity ("% R.H."), for purposes of incubating the thus-inoculated tiles.

After five (5) days incubation at the above conditions, each such tile was observed microscopically for the presence of fungal growth. After recording the observations, each such tile was subjected to that number of wash/rinse cycles, specified below in connection with Table I, with respect to a commercially-available household dishwasher. No detergent was used. Each such wash/rinse cycle, which ran for about a 25-minute period, did not include a drying cycle. De-ionized water was used in conjunction with each such wash/rinse cycle. The dishwasher used by us, sold under the brand name "KITCHEN AID", and bearing model number KDC-17, is available from Hobart Manufacturing of Troy, Ohio.

After the tiles—which were subjected to that number of wash/rinse cycles specified below in connection with Table I—were allowed to dry, they were re-inoculated in the manner set forth above, and thereafter such tiles were allowed to again incubate at 28° C. in the 95% R.H.-controlled environment, mentioned above. These results are summarized in Table 1, below.

TABLE 1

Number of Tiles Showing Growth Per Number of Tiles Inoculated

| Concentration of Active Quaternary Ammonium Compound in Solution | Number of Tiles Evidencing Microbial Activity Per Total Number of Tiles Observed (+ = Growth) | | | |
|---|---|---|---|---|
| | Case 1 | Case 2 | Case 3 | Case 4 |
| Untreated Control | 2+/2 | −1/ | −1/ | −1/ |
| 250 p.p.m. | 5+/5 | 2+/2 | 1+/1 | 2+/2 |
| 500 p.p.m. | 1+/5 | 0+/2 | 1+/1 | 2+/2 |
| 1000 p.p.m. | 0+/5 | 0+/2 | 1+/1 | 2+/2 |

1. Because the untreated control of Case 1 showed no biocidal activity, controls were not utilized in Cases 2 through 4. Therefore, the expression ("—") means that the identified case did not include a control.
Case 1 represents 5-day incubation of the tiles (or "slides"), and results observed before any washing.
Case 2 represents washing of the slides once, before re-inoculation.
Case 3 represents washing of the slides 4 times, before re-inoculation.
Case 4 represents washing of the slides 8 times, before re-inoculation.
To assist the reader in the interpretation of the data presented in Table I, above, the expression "5+/5" means five (5) tiles evidencing fungal growth out of five (5) tiles observed; the expression "1+/5" means one (1) tile evidencing fungal growth out of five (5) tiles observed; and the expression "0+/5" means zero (0) tiles evidencing fungal growth out of five (5) tiles observed.

EXAMPLE 2: ANOTHER SHOWER STALL COATING FORMULATION

Another shower stall coating formulation was produced as follows.

A monomer-containing mixture was prepared at room temperature (i.e., 25° C.) as follows. Into a 250-milliliter flask, the following ingredients were added simultaneously: 60 grams of 2-hydroxyethyl methacrylate ("HEMA") hydrophilic monomer; 40 grams of acrylic acid ("37 AA") carboxylic acid-functional monomer; 0.37 grams of ammonium persulfate ("APS") initiator; and 25 grams of water (solvent), thereby producing the monomer-containing mixture, mentioned above. The flask-contained mixture was then set aside, at room temperature, until needed for use. This flask, which thus contained a polymerizable monomeric mixture, is designated as "Flask No. 1" throughout the remaining discussion concerning Example 2.

Next, 375 grams of additional water and 100 grams of ethanol, as solvents, were introduced into a 1000-milliliter 4-necked flask ("Flask No. 2"), which was equipped with a stirrer and heating means. The solvent within the 4-necked flask was stirred and heated to a reaction temperature of about 80 degrees Celsius (.° C.") while the inert gas nitrogen ("N2") was maintained in the headspace of Flask No. 2. Then to the thus-heated-and-agitated flask-contained solvent was added 0.046 grams of the above-mentioned APS initiator.

Immediately thereafter, the above-described monomeric mixture within Flask No. 1 was added to the contents of Flask No. 2 at a uniform addition rate over a period of about 2 hours.

After completion of addition of such monomeric mixture to the 4-necked flask ("Flask No. 2"), an additional 0.046 grams of APS initiator was quickly added to the contents of Flask No. 2. Finally, the now-polymerizing reaction solution within Flask No. 2 was stirred for an additional three (3) hours, while the reaction temperature of 80° C. was maintained, before heat was removed.

The resultant hydrophilic polymer-containing solution, determined as being about 16.5 percent nonvolatiles ("% NV"), on a total weight basis, was used without further purification.

Then, utilizing the above-described GPC analytical methods, the thus-produced hydrophilic polymer was determined as having a number-average molecular weight ("$M_n$") of about 40,000 and a weight-average molecular weight ("$M_w$") of about 160,000. The thus-produced hydrophilic polymer, moreover, consisted of 40 weight percent acrylic acid (the carboxylic acid-functional vinyl monomer) and 60 weight percent 2-hydroxyethyl methacrylate (the hydrophilic vinyl monomer).

The thus-produced hydrophilic polymer was then utilized to produce a polymeric shower stall coating formulation, capable of providing a so-called "water sheeting" effect. The details are as follows.

533 grams of a 10 wt.-% hydrophilic polymer-containing solution was prepared by dissolving 301 grams of the thus-produced hydrophilic polymer solution into 177 grams of deionized water and 22 grams of commercially-available concentrated ammonia (i.e., 28 to 30 weight percent ammonia in water). To this was added 33 grams of a 15 weight percent ("wt.-%") aqueous solution of zinc ammonium carbonate.

Thereafter, 10 grams of the thus-produced 10 wt.-% hydrophilic polymer-containing solution were combined with 88.65 grams of de-ionized water to produce 98.65 grams of a nominal 1 wt.-% hydrophilic polymer-containing solution. Next, 0.75 grams of a 15 wt.-% aqueous solution of zinc ammonium carbonate, 0.5 grams of a 28 wt.-% aqueous solution of ammonium hydroxide, and 0.1 grams of "ZONYL FSJ" brand wetting agent (described above) were sequentially incorporated into the nominal 1 wt.-% hydrophilic polymer-containing solution, to produce the water-sheeting coating formulation.

Water Sheeting Evaluation Procedure

A thin film of the shower stall coating formulation of Example 2 was applied to one side of a 5-by-7 inch clear glass panel. The coating-applied panel was then placed in a "KENMORE" brand dishwasher (Model No. 587-700614) and turned on, using hot tap water (i.e. about 120° F.) only, for a 30-minute cycle, for purposes of simulating conditions in a bathroom shower. (Such a 30-minute dishwashing cycle consisted of water, only, running over the glass.) Following completion of the so-called "dishwashing" cycle, water only was again rinsed over the plate; and, thereafter, the plate was observed for sheeting effect, using the uncoated side of the glass as a control. Sheeting was observed to be present after two complete dishwashing cycles.

EXAMPLE 3: FOG-RESISTANT COATING FORMULATION

The procedures set forth above in Example 2 were again utilized, to produce a fog-resistant coating formulation.

Fog-Resistance Testing Procedure

To evaluate the fog-resistant quality of the formulation of Example 3, the following procedure was employed. First, a beaker of tap water was placed on a laboratory hot plate and heated. An untreated piece of clear glass, when held about one (1) inch above the thus-heated beaker of water, was observed to fog when the water temperature reached 120 degrees Fahrenheit ("°F.").

A second, similar piece of clear glass, treated on prior occasion with the fog-resistant coating formulation, when similarly held above the heated beaker of water was observed to remain unfogged even when the water within the beaker was at the normal boiling temperature for water (i.e., 212° F.).

The second piece of glass had been treated by pouring a portion of the 1 wt.-% hydrophilic polymer-containing solution, of Example 3, over one-half of the surface of the piece of glass and thereafter disposing the piece of glass in a vertical position, at a temperature of 25° C., until dry.

EXAMPLE 4: COATING POSSESSING GERMICIDAL ACTIVITY

The biocidally-active coating formulation of Example 1 was again utilized, for purposes of demonstrating the disinfectant properties of the coating formulation of our invention. The details are as follows.

99.78 weight percent of the 10 wt.-% hydrophilic polymer-containing solution of Example 1 was combined with 0.20 weight percent "HYAMINE 3500" (brand) germicidally-active ingredient, and 0.02 weight percent "ZONYL FSJ" (brand) fluorosurfactant. In particular, the hydrophilic polymer-containing solution was introduced into a vessel of suitable volume, equipped with agitation means; next, the germicidally-active ingredient and the fluorosurfactant were sequentially then combined with the hydrophilic polymer-containing solution within the vessel, at temperature; and, finally, the vessel contents were agitated until the germicidally-active ingredient and the fluorosurfactant went into solution in the hydrophilic polymer-containing solution. The resultant solution was then screened against a particular micro-organism, namely *Staphylococcus aureus*, to demonstrate disinfectant properties of our invention, principally as a germicidal agent.

To assist us in this regard, a textbook entitled Official Methods of Analysis", of the Association of Official Analytical Chemists ("AOAC"), edited by Kenneth Helrich, 15th edition, and published 1990 by the Association of Official Analytical Chemists, Incorporated, of Arlington, Va., was consulted for the following procedures. A synthetic broth as well as a Letheen broth were prepared in accordance with the procedures set forth in section 955.11 on pages 133–135 of this textbook. Other procedures set forth in section 961.02 on pages 140–141 of this textbook were followed to demonstrate the disinfectant properties of the above-mentioned resultant solution as a germicidal spray product. In particular, twenty (20) slides were sprayed with the above-described germicidal liquid product, in accordance with the above-noted textbook procedures. Results indicated no growth of the above-noted micro-organism after 48 hours incubation at 35° C.

What has been described herein is a novel, durable, alkali-soluble, hydrophilic polymer coating formulation. While the formulation of our invention has been described with reference to preferred embodiments or examples, it is to be understood that our invention is not to be limited to such. In particular, the coating formulation comprises a volatile aqueous-based medium and nonvolatile components dissolved in the aqueous medium. Such an aqueous medium which thus includes volatile ingredients and/or components, can advantageously be readily applied onto a substrate surface that is e.g. vertically oriented or disposed. Thereafter, the volatile components of the base-containing aqueous medium can be caused to evaporate, at for example room temperature, to produce a dry coating on the vertical surface of the substrate. Accordingly, various alternatives, changes, and modifications will become apparent to those skilled in the art upon reading the foregoing description. It is to be understood, therefore, that such alternatives, changes and modifications are to be considered as forming a part of our invention insofar as they fall within the spirit and scope of the appended claims.

We claim:

1. A method of disinfecting a substrate comprising applying an effective amount of a biocidally-active alkali-soluble polymeric coating formulation to the substrate, for disinfecting the substrate, wherein the biocidally-active alkali-soluble polymeric coating formulation comprises: a volatile, aqueous carrier; an alkali-soluble hydrophilic solution polymerized polymer having a number average molecular weight of at least about 10,000 and being present, in the aqueous carrier; an alkali-soluble multivalent metal ion-containing bond-forming agent, in the aqueous carrier; an effective amount of a volatile alkali ingredient, in the aqueous carrier, for dissolving both the hydrophilic polymer as well as the multivalent metal ion-containing bond-forming agent, wherein the relative amounts of hydrophilic polymer and multivalent metal ion-containing bond-forming agent in the aqueous carrier are effective for forming an alkali-soluble polymeric coating on a substrate upon evaporation of the volatile carrier therefrom; and an effective amount of a biocidally-active ingredient, for providing the alkali-soluble quasi crosslinked polymeric coating formulation with disinfectant properties.

* * * * *